G. W. WOODWARD.
SELF OPERATING TALKING MACHINE.
APPLICATION FILED JAN. 20, 1919.
1,349,705.
Patented Aug. 17, 1920.
4 SHEETS—SHEET 1.
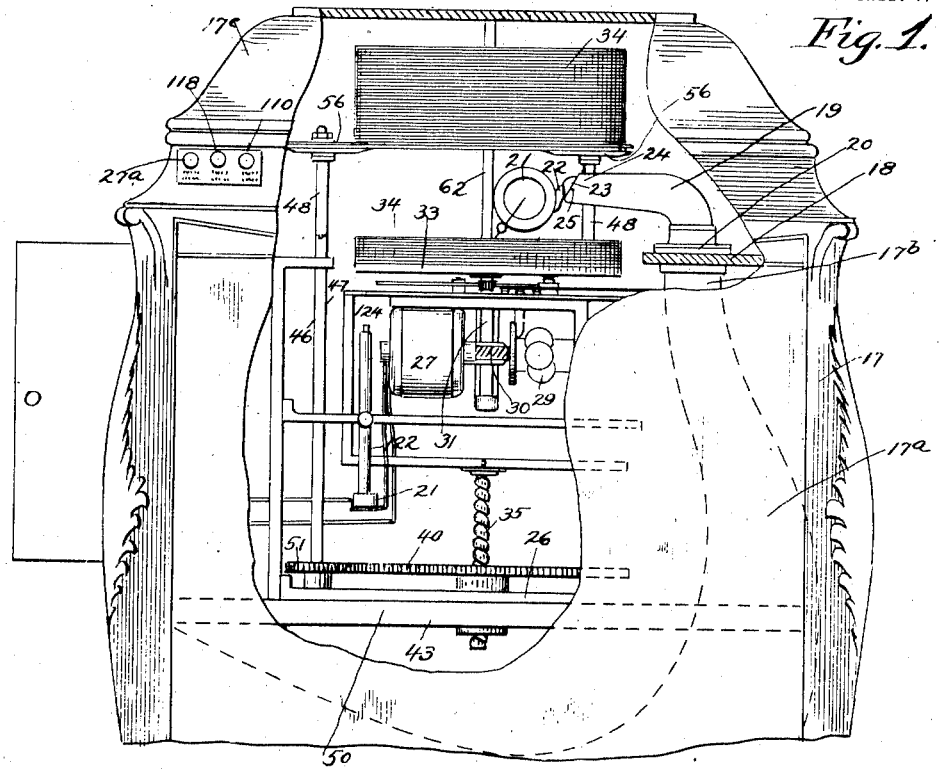
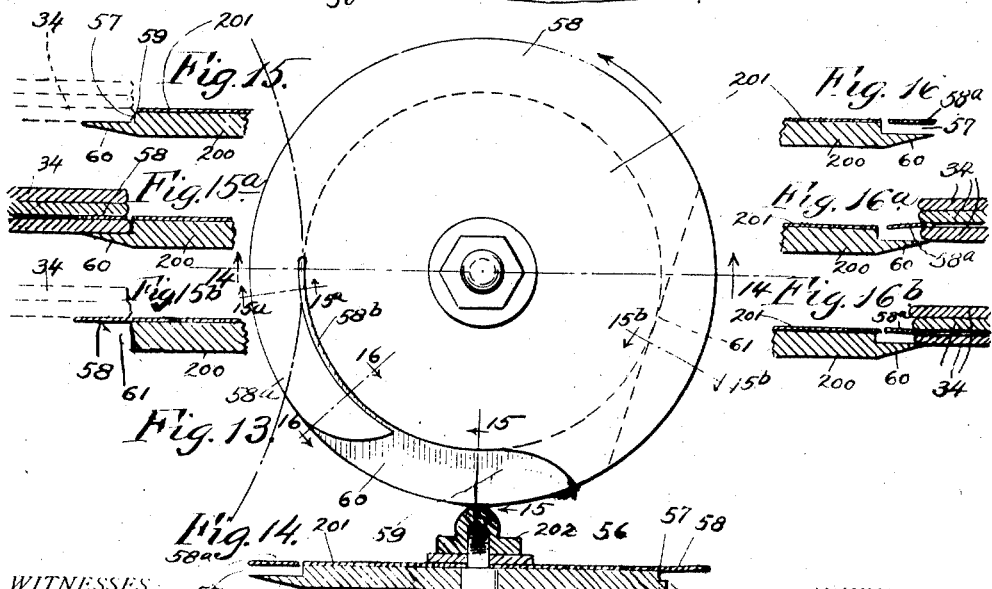

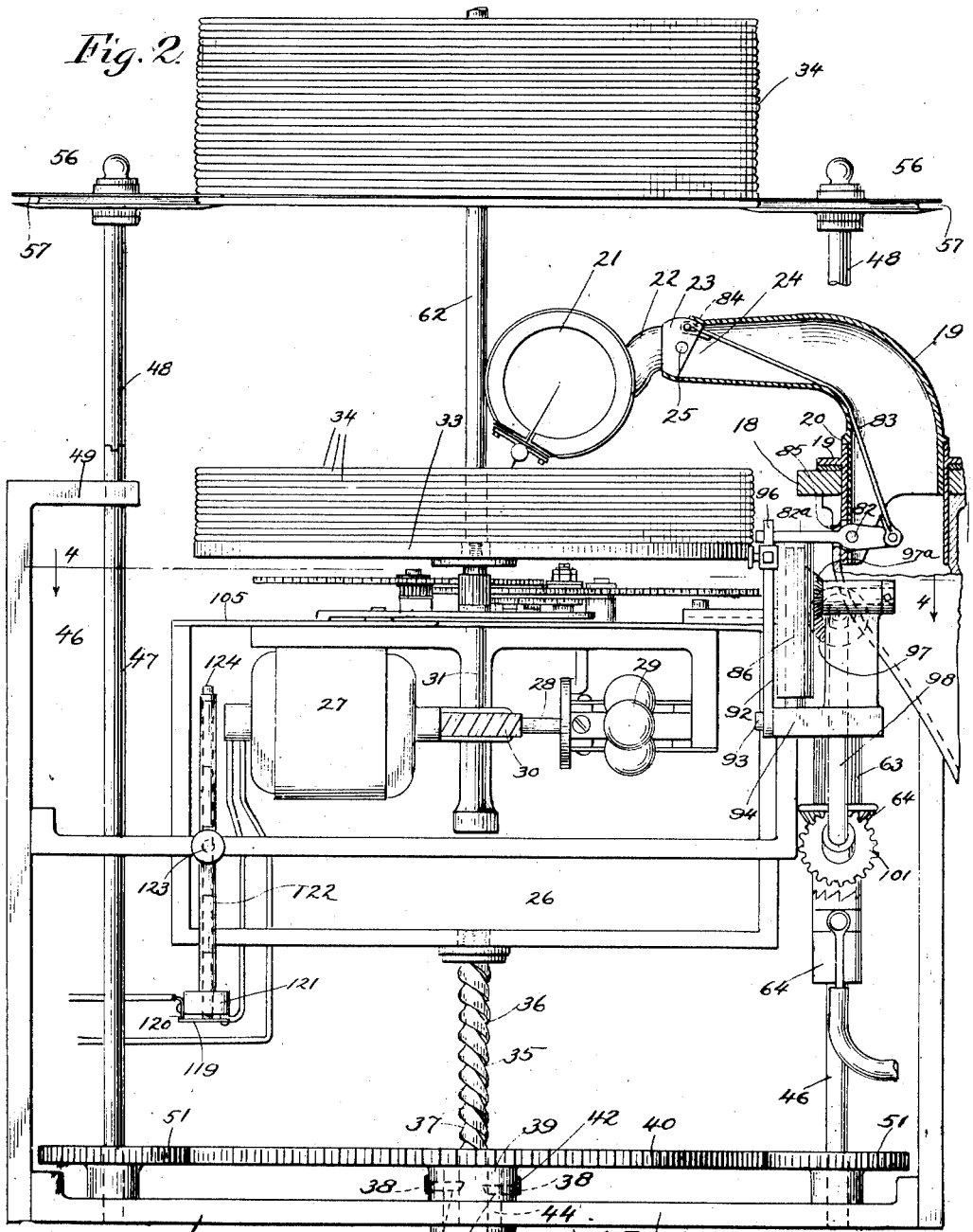

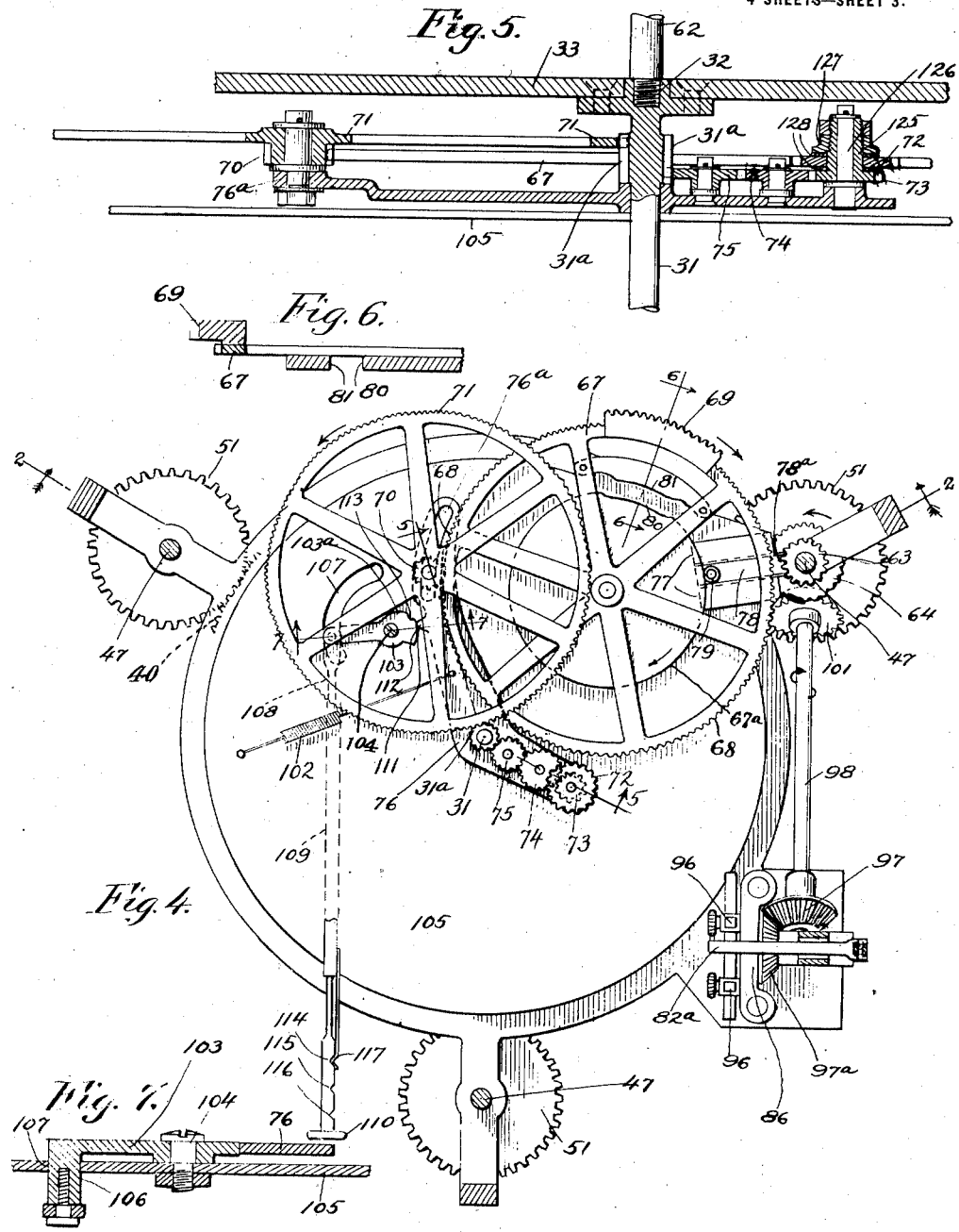

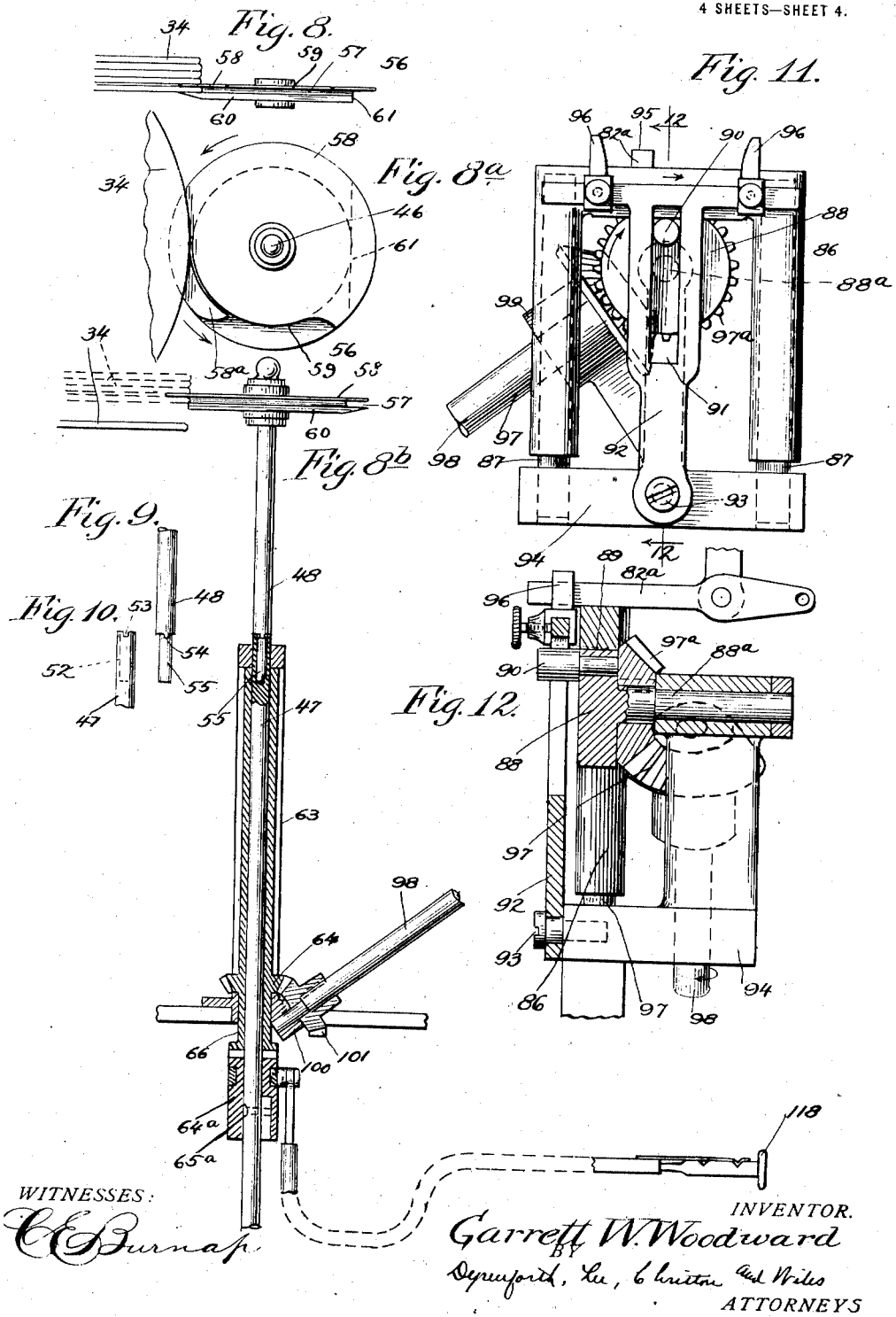

UNITED STATES PATENT OFFICE.

GARRETT W. WOODWARD, OF CHICAGO, ILLINOIS, ASSIGNOR, BY MESNE ASSIGNMENTS, TO AMERICAN AUTOMATIC PRODUCTS CORPORATION, A CORPORATION OF ILLINOIS.

SELF-OPERATING TALKING-MACHINE.

1,349,705.  Specification of Letters Patent.  Patented Aug. 17, 1920.

Application filed January 20, 1919. Serial No. 272,112.

*To all whom it may concern:*

Be it known that I, GARRETT W. WOODWARD, a citizen of the United States, residing at Chicago, in the county of Cook and State of Illinois, have invented a new and useful Improvement in Self-Operating Talking-Machines, of which the following is a specification.

My invention relates to improvements in talking machines of the type wherein provision is made for automatically playing, in succession, a plurality of records without requiring any action on the part of the operator; and my primary objects are to provide improvements in machines of this type to the end that the mechanism may be simplified and rendered less expensive; the space occupied by the mechanism and records may be reduced to the minimum, particularly with a view to providing a machine of such size that it will be especially desirable for household use, and to provide for the replaying of any record, and by a simple manipulation so condition the machine that it may be played in the usual way and those parts of the machine which form portions of the automatically operated mechanism and exposed to view in the machine, may be readily removed to cause the machine to present the same appearance as the non-automatic type of machine; and other objects as will be understood from the following description:

Referring to the accompanying drawings, Figure 1 is a view in side elevation, with certain parts broken away, of the upper portion of a cabinet talking machine constructed in accordance with my invention, the parts illustrated being shown in the positions they assume while playing one of the records. Fig. 2 is an enlarged elevational view of the operating mechanism shown in Fig. 1, certain parts being broken away and viewing the record-feeding devices at the irregular line 2—2 on Fig. 4. Fig. 3 is a section taken at the line 3—3, on Fig. 2, and viewed in the direction of the arrows, with the frame removed. Fig. 4 is a plan section taken at the line 4 on Fig. 2, and viewed in the direction of the arrow. Fig. 5 is an enlarged broken view taken at the irregular line 5—5, on Fig. 4, and viewed in the direction of the arrows. Fig. 6 is an enlarged broken sectional view taken at the line 6—6, on Fig. 4, and viewed in the direction of the arrows. Fig. 7 is an enlarged section taken at the line 7—7, on Fig. 4, and viewed in the direction of the arrows. Fig. 8 is a view in side elevation of one of the similar record-feeding disks showing records thereon, this view illustrating one of the positions of the feeding disk. Fig. 8$^a$ is a plan view of the disk of Fig. 8. Fig. 8$^b$ is a view, in elevation, of the feeding disk of Figs. 8 and 8$^a$, together with its supporting and operating mechanism shown in section, the disk being shown in the position it assumes when in record-feeding position, a portion of the record being shown by dotted lines in a position preparatory to feeding, and by full lines in the act of dropping from the feeding means to the turn-table of the talking-machine mechanism. Fig. 9 is a view in side elevation of the lower end of the upper section of the spindle which supports and drives the record-feed disk. Fig. 10 is a similar view of the upper end of the other section of this spindle. Fig. 11 is a view in side elevation of a portion of the mechanism for raising and lowering the tone-arm and swinging it out of the path of movement of the records in the feeding of the same to the turn-table. Fig. 12 is a section taken at the line 12—12, on Fig. 11, and viewed in the direction of the arrows. Fig. 13 is an enlarged plan view of the disk of Fig. 8. Fig. 14 is a section taken at the line 14—14, on Fig. 13, and viewed in the direction of the arrows. Fig. 15 is a section taken at the line 15—15, on Fig. 13, and viewed in the direction of the arrows, showing certain of the records imposed thereon in the positions they assume when this part of the feeding disk registers with the records. Fig. 15$^a$ is a section taken at the line 15$^a$—15$^a$, on Fig. 13, and viewed in the direction of the arrows, showing certain of the records engaged with this portion of the feed-disk when this portion of the feed-disk is moved to a position where it engages the records. Fig. 15$^b$ is a section taken at the line 15$^b$—15$^b$, on Fig. 13, and viewed in the direction of the arrows, showing certain of the records engaged with this portion of the feed-disk, when this portion of the feed-disk is moved to a position where it engages the records. Fig. 16 is a section taken at the line 16—16, on Fig. 13, and viewed in the direction of the arrows. Fig. 16$^a$ is a section taken at the line 16—16, on Fig. 13, showing this portion of the feed-disk in a position where it engages records illustrating the action of the feed-disk upon a relatively thick record; and Fig. 16ᵇ, a view like 16ᵃ, showing the action of the feed-disk upon a relatively thin record, both Figs. 16ᵃ and 16ᵇ showing the feed-disk in the act of becoming projected between the lowermost record and those above it.

In the particular construction illustrated, 17 represents a cabinet of the general shape and proportions, as commonly provided for housing the mechanism of the usual non-automatic talking machine, this cabinet housing a concealed horn 17ᵃ, the restricted end of which extends upwardly at the back portion of the cabinet where it terminates in a socket portion 17ᵇ supported on a bracket 18 connected with the cabinet 17, this socket forming a pivotal support for a tone-arm 19 which carries a flange 20 depending against the upper edge of the socket member. The tone-arm 19 carries the reproducer 21 which may be of any suitable construction, such as is commonly employed in the art, the reproducer communicating with a hollow section 22 carried thereby and terminating in a segmental ball portion 23 pivoted in the outer socketed extremity 24 of the tone-arm 19, as represented at 25, to adapt the reproducer to be swung up and down on its pivot as hereinafter described.

The cabinet 17 contains in its upper portion, which is equipped with the hinged top 17ᶜ, a vertically movable frame 26 carrying the record-driving mechanism, which may be of any suitable construction. In the drawings, and as I prefer to manufacture my improved machine, the driving power is an electric motor 27 controlled through a switch button 27ᵃ on the cabinet, this motor being supported in the frame 26 and driving a shaft 28 having a governor 29, this shaft being in the form of a worm, not shown, meshing with a worm wheel 30 fixed on the upright shaft 31 journaled in the frame 26 and equipped at its upper end, which is preferably socketed as indicated at 32, with the circular turn-table or platform 33, for receiving the records to be played and which are represented at 34, it being understood that when the motor 27 is operated, it will revolve the turn-table 33 in clockwise direction, as shown in Fig. 4.

The frame 26 is supported through the medium of a stem 35 connected with this frame centrally thereof and provided in the form of a spiral 36, the underside of the thread thereof presenting abrupt shoulders as represented at 37, for coöperation with pawl mechanism which, as shown, comprises a pair of pawls 38 mounted in a circular boss 39 depending from the underside of a gear 40 having journal support on a stationary cross-piece 43 rigidly secured to the inside of the cabinet 17. These pawls, which are diametrically opposed, slide in channels 41 in the boss 39 and are backed up by a circular spring-device 42 which yieldingly holds these pawls in interlocking relation to the spiral on the stem 35. The boss 39 rests upon an upper surface of the cross-piece 43, the lower end of this boss being of reduced diameter at the portion 44, at which portion it extends through an opening in the cross-piece 43 and has secured thereto, below this cross-piece, a collar 45 to prevent upward displacement of the boss 39. The construction of this part of the mechanism is such, as will be understood, that in the rotation of the gear 40 in clockwise direction in Fig. 4, the stem 35 and record-driving parts carried thereby will be caused to bodily descend, and if the operator wishes to bodily lift the mechanism just referred to, this may be done by drawing up on the frame 26, the spiral 36 running idly across the ends of the pawls 38.

In accordance with the preferred illustrated embodiment of my invention, I provide the records to be automatically played, in a pile, or stack, and at the conclusion of the playing of any one record, automatically move the tone-arm out of the path through which the records move in the changing operation and cause, by a movement in a substantially vertical plane, another record to be presented for playing, it being preferred that the records be fed one at a time from a stack thereof located in spaced relation above the turn-table 33, to a position on the turn-table, on which the records pile up in superposed position as the successive playing of the same progresses, a description of the mechanism for feeding the records one by one of the turn-table being as follows:

Grouped about the spindle 31 preferably equidistantly spaced apart, to extend vertically, are spindles 46 each formed of a lower section 47 and an upper section 48. The lower spindle sections are journaled at their upper and lower ends in extensions 49 of a frame 50 of which the cross-piece 43 is a part, and in bearing portions in this cross-piece, respectively, and each of the sections 47 is provided at its lower end with a gear 51 rigidly connected therewith and meshing with the gear 40, the gears 51 being grouped about the gear 40, as shown in Fig. 4. The upper ends of the spindle sections 47 contain sockets, as indicated at 52, the upper walls of these sockets being recessed, as indicated at 53, to receive the depending lugs 54 provided on the lower ends of the spindle sections 48, the extremities of which, represented at 55, are of reduced diameter and fit into the sockets 52, the purpose of this construction being to provide for the disengagement of the spindle sections 48 from the sections 47 and the interlocking of these sections together to permit the sections 48 to be driven from the sections 47, as hereinafter explained. Each of the spindle-sections 48 is equipped at its upper end with a feed disk 56 rotatable therewith and containing a groove 57 in its periphery, this groove being preferably of a thickness slightly greater than that of the records to be used on the machine. The upper flange 58 of each feed-disk 56 is cut away at one portion to the depth of the groove 57, as represented at 59. The lower flange of each disk, represented at 60, is cut away substantially to the bottom of the groove 57 at one part thereof, as indicated at 61, the purpose of these cut-away portions, in combination with the grooves 57, being that of effecting, by rotation of the disks 56, the separation of the lowermost record supported by these disks, from the stack of records above it to permit this lowermost record to descend into a position to be played, and hold the remaining records of the stack, or pile, in supported position. To this end, the disks 56 are so arranged, as shown, that in the normal position of the parts of the machine the lowermost record of the stack, or pile, thereon, supported by these disks, extends at its edges, into the grooves 57 of the disks 56, the upper and lower flanges 58 and 60 of these disks embracing the record, as shown in Figs. 2, 8 and 15$^a$. In the rotation of these disks in anti-clockwise direction, the cut-away portions 61 thereof are moved into registration with the edges of this lowermost record, while the flanges 58 are interposed between the latter and the next record above it, with the result of permitting this lowermost record to fall, as shown in Fig. 8$^a$, to become superposed on the record, or pile thereof, previously placed upon the turn-table, the record running down a rod 62 which screws into the socket 32 in the center of the platform 33 and passes upwardly through the central holes universally provided in talking machine records of the disk type. Continued rotation of the disks 56 in anti-clockwise direction, carries the cut-away portions 59 thereof into registration with the edges of the lowermost record of the stack, whereupon the stack of records lowers to a point where they are supported by the lower flange 60, as represented in Fig. 15, and further movement of the disks 56 in the same direction carries the flanges 58 into a position wherein they extend between the lowermost record of the stack and the one next above it, as represented in Figs. 2 and 15$^a$, it being understood that this operation of separating the lowermost record from the stack, discharging it to the turn-table and repositioning another record of the stack for delivery to the turn-table upon the next operation of the feeding mechanism, is accomplished during the turning of each disk 56 throughout one revolution.

Inasmuch as talking machine records as commonly provided are not of uniform thickness at their edge portions, and to insure the proper separation of the lowermost record from the ones immediately above it in the operation as hereinbefore described, I provide each flange 58 at its cut-away portion 59 with the flexible section 58$^a$, preferably shown as in the form of a tongue, as by slitting the flange 58 along the line 58$^b$. Thus, after a record has become deposited upon the flange 60 immediately below the cut-away portion 59 of the flange 58, and the section 58$^a$ in the rotation of the disk moves into contact with these records to separate the one so deposited upon the flange 60 from those above it, the section 58$^a$ will, in case the edge of the record is thicker or thinner than the usual record, deflect upwardly or downwardly as the case may be (Figs. 16$^a$ and 16$^b$), to insure this separation without producing a jamming action against the records which, if such occurred, might impair the structure, as well as the operation, of the machine. I preferably construct the disk devices 56 as shown in Fig. 14, namely, by providing a circular plate 200 mounted on the upper end of the spindle section 48 and grooved at its upper edge to provide the base and inner wall of the groove 57, and a relatively thin plate 201 superposing the plate 200 and held with the latter against rotation on the spindle 48, by a nut 202. The plate 201 may be of such material and of such gage that the section 58$^a$ formed therefrom by slitting the metal along the line 58$^b$, will present the desired flexibility for operating as hereinbefore described, but the remainder of the disk 201 where it extends over the flange 60, will be sufficiently stiff to properly support the stack of records carried thereby.

Reference has been made to the vertically movable frame 26 carrying the turn-table and driving mechanism therefor, this feature of the machine permitting of the lowering of the turn-table each time a record is delivered to it from the feeding mechanism referred to, a distance substantially equal to the thickness of a record, so that the reproducer 21 will always be located in substantially the same horizontal plane while playing a record, regardless of the number of records superposed on the turn-table. The connection, as it will be noted, between the spindles 46 and gear 40, through the medium of the gears 51, serves to cause the gear 40, each time the feed disks are rotated for the purpose hereinbefore explained, to revolve sufficiently to permit the frame 26 to lower a distance substantially equal to the thickness of a record.

As the spindles 46 are connected together through the medium of the gears 40 and 51 to operate in unison, it is necessary only that the driving power be applied to one of the spindles and to this end I provide on one of the spindle sections 47, a relatively long pinion 63 carrying a bevel gear 64, this pinion being connected with the spindle section 47, for driving the latter, by means of a clutch 64ª slidable along the spindle 47 and feathered thereto as indicated at 65ª, the clutch 64ª being adapted to become interlocked at its upper toothed extremity with the lower toothed extremity of a sleeve 66 rigid with the gear 64. The elongated pinion 63 is driven from the shaft 31 through the medium of intermittently-operating mechanism, a description of the form of this mechanism as shown, being as follows:

Journaled on the frame member 26 is a gear 67 which carries at its periphery and extending beyond its annular series of teeth 68, a segmental gear-section 69 adapted, in the rotation of the gear 67 to mesh with, and drive, the elongated gear 63. The teeth 68 of the gear-member 67 are positioned to intermesh with either a pinion 70 rigid with a gear 71, or with a gear 72 which is frictionally connected with a gear 73 as hereinafter described, which latter meshes with a gear 74, the gear 74 meshing with a gear 75 and the gear 75 with a gear 31ª on the shaft 31. The gears 70 to 75, inclusive, are supported on a bracket 76 which is journaled on the shaft 31, the gears 70 and 71 being rigidly connected together and supported in the arc-shaped slot 76ª of the bracket 76 to be adjustable therein along this bracket, and the arrangement of these gears and bracket is such that by swinging this bracket in one direction, the gear 70 meshes with the gear 67 and the gear 72 is out of mesh with the gear 67, and when swung in the opposite direction the gear 70 disengages from the gear 67 and the gear 72 meshes with the gear 67, or, in other words, the gear 67 may be driven from the shaft 31 through the gears 31ª, 71 and 70 in which case the gear 67 rotates relatively slowly, or it may be driven from the shaft 31 through the gears 31ª, 74, 75, 73, and 72, in which case the gear 67 is caused to rotate relatively rapidly, the gear 31ª at all times meshing with the gear 71 and gear 75.

It will be noted from the foregoing that the pinion 63 will be rotated only when the gear 67, in its rotation in the direction of the arrow in Fig. 4, carries the segmental gear 69 into intermeshing engagement with the gear 63, thereby producing an intermittent rotation of the gear 63. Inasmuch as the record-feeding devices are not to be operated to shift the records until the record previously positioned for playing has been played to the end, the gears should be so proportioned that this result will be accomplished. With the ordinary ten-inch record, as now commonly provided, it is preferred that the ratio of these gears be such that the record-feeding devices will be operated each time the platform revolves approximately 300 times, when the member 76 is set to cause the drive from the shaft 31 to be through the medium of the gears 70 and 71.

It is preferred that some means be provided for positively locking the gear 63 against rotation during the time that the segmental gear 69 is out of mesh therewith, the preferred means which I provide for this purpose comprising the following mechanism:

Mounted in guides 77 on frame 26 is a slide 78 provided at its outer end with teeth 78ª adapted to interlock with the teeth on the gear 63 and carrying at its inner end a stud 79 which coöperates with a cam on the gear 67 formed of the surfaces 80 and 81 which are disposed substantially in the same radial line as the segmental gear 69 and are so formed, as shown, that in the rotation of the gear 67 in clockwise direction in Fig. 4, the slide 78 by reason of engagement of its stud 79 with the cam surfaces referred to, will be withdrawn from engagement with the gear 63 immediately preceding the intermeshing of the segmental gear 69 with the gear 63 and will be forced back to interlocking engagement with the gear 63 immediately following the disengagement of the segmental gear 69 from the gear 63, the slide 78 being held against disengaging from the gear 63 when not actuated by the cam surfaces as described, by opposing the surface 67ª concentric with the axis of a gear 67.

Coöperating with the swinging tone-arm 19 is a mechanism for automatically lifting the reproducer 21 from the record at the conclusion of the playing of the latter, swinging the tone-arm with the reproducer to a position in which it is out of the path of movement of the descending record, and after a new record has been positioned on the revolving platform 33, swinging the tone-arm to cause the reproducer to extend over the record and thereupon lowering the reproducer into playing engagement with the record, a description of these means, as I prefer to construct them, being as follows:

Pivoted to the lower end of the tone-arm on a shaft 82, is a rock-lever 82ª which extends at one end into the tone-arm where it is connected with a flexible medium, as, for example, a wire 83, which slides against the elbow-portion of the tone-arm and is connected at its upper end, at 84, with the inner end of the member 22, whereby when the lever 82ª is rocked in clockwise direction in Fig. 2, the reproducer 21 will be lifted free of the record beneath it. The outer end of the lever 82ª, which works through a slot 85 in the socket 17ª, this slot being elongated in both directions, extends across the top of a vertically movable member, or frame, 86, mounted on stationary guides 87 with which it telescopes, this frame coöperating with a cam 88 on a shaft 88ª, this cam being circular except for a flat portion at its upper end as indicated at 89. The relation of these parts is such that in the rotation of the cam 88, as hereinafter described, the frame 86 will be raised from the normal position shown in Fig. 11 to a position in which the lever 82ª is moved to a position in which the reproducer 21 is raised out of engagement with the record. The cam 88 carries an eccentrically-disposed pin 90, which extends into an elongated slot 91 in an upwardly disposed lever 92, pivoted as indicated at 93, to the part of a bracket 94 carrying the rods 87. The upper end of the lever 92, which is thus free to rock on its pivot 93 in either direction in Fig. 11, is in the form of a cross-bar 95 on which tappets 96 are mounted to be adjustable lengthwise of this bar, these tappets being of such height that they extend into overlapping position relative to the outer end of the lever 82ª when the frame 86 is in either the lower, normal, position shown in Fig. 11, or in the raised position hereinbefore referred to.

The cam 88 is driven through the medium of a bevel pinion 97 meshing with a bevel pinion 97ª rigid with the cam 88, the bevel pinion 97 being rigid on an inclined shaft 98 journaled at its opposite ends in bearings 99 and 100 on a stationary part of the machine, the shaft 98 carrying a bevel pinion 101 meshing with the gear 64, whereby the frame 86 and rock-lever 92 are actuated from the bevel gear 64.

A description of the operation of the machine in so far as it has been described, is as follows:

Assuming that a pile of records 34 is supported on the feed disks 56 and the needle of the reproducer portion 22 of the sound-reproducing mechanism is traveling in the spiral groove of a record being driven by the turn-table 33, when the needle passes the record-portion of the groove, the end of the cam surface 81 engages the pin 79 and shifts the slide 78 out of intermesh with the gear 63 and immediately following this operation, the segmental gear 69 meshes with the elongated gear 63 rotating the latter, with the result of rotating the one of the feed-disks 56 connected therewith, and through the medium of the gears 51 and central gear 40, rotating the other two feed-disks 56, which are thus caused simultaneously to rotate in the same direction, namely, in a counter-clockwise direction in Fig. 4. Concurrently with the rotation of these disks, the gear connection 64 and 101 between the spindle 46 and the shaft 98 drives the latter, and through its gear connection 97 and 97ª with the shaft 88ª, the cam 88 is rotated, with the result of lifting the frame 86 and rocking the lever 92 to the right in Fig. 11. Thus, lifting the frame 86 rocks the lever 82ª in clockwise direction in Figs. 2 and 12, and tilts the reproducer portion 21 upwardly, lifting it clear of the record. The left-hand tappet 96 in Fig. 11, under the rocking action of the lever 92, moves to the right in this figure against the lever 82ª with the result of swinging the tone-arm bodily in a horizontal plane on its pivot, while the reproducer 21 is maintained in raised position above the record, to a position in which it extends laterally beyond the turntable 33 and thus is out of the vertical plane occupied by the records. During this actuation of the tone-arm, as stated, the disks 56 have been revolving at the unmutilated parts of their lower flange-portions 60 against the lowermost records supported thereby, but following a swinging of the tone-arm, as stated, the mutilated portions 61 of these flanges move into registration with the edges of the lowermost record and the latter thereupon is released and slides down the stem 62 to superposed position on the previously-played record on the turn-table 33. In this discharging operation, the top flanges 58 engage the record next to be discharged (Figs. 8ᵇ and 15ᵇ), and thus support the remaining records of the pile. As the feed-disks 56 continue to revolve, the mutilated portions 59 of the top flanges 58 register with the edges of the records and the entire pile descends and rests on the lower flanges 60, and before these disks finish their single revolution, the upper flanges 58 move into position between the two lowermost records (Fig. 2), the normal position of the parts. In this connection attention may be directed to Figs. 15, 15ª, and 15ᵇ, the first of which shows the disk in a position wherein the records oppose the mutilated portion 59 of the upper flange and rest upon the flange 60; the second of which shows the disk revolved to a position where the lowermost record has been separated from those above it and lies between the flanges 58 and 60; and the remaining view showing the disk moved to a position wherein the mutilated portion 61 of the lower flange registers with the records which has permitted the lowermost record to fall, those records immediately above it being retained by resting upon the unmutilated portions of the upper flanges 58.

The parts of the mechanism are so constructed and arranged that closely following the record-feeding operation, the sound reproducer is swung back over the newly positioned record and lowered into engagement with the outer end of its record-groove, whereupon the selection presented by this record is played, the repositioning of the reproducer as just stated, being effected by the engagement of the right-hand tappet 96 with the lever 82ª in the swinging of the lever 92 to the left in Fig. 11, which swings the tone-arm horizontally to a position in which its reproducer is above the record, and the lowering of the frame 86 when the cam portion 89 reaches its uppermost position which permits the lever 82ª to swing back to normal position in which the reproducer engages the record. The rotation of the gear 40 simultaneously with the rotation of the gears 51, causes the pawl devices 38 to rotate therewith in anti-clockwise direction, in Fig. 3, with the result of permitting the frame 26 and parts carried thereby to lower, these parts being so constructed and proportioned that this frame, together with the turntable 33 and other parts carried thereby, will lower with each record-feeding operation, a distance substantially equal to the thickness of the record. Thus the plane in which the records are played remains substantially a constant.

It will be understood that in the re-positioning of records for automatic feeding and in restoring the machine for normal, non-automatic playing, the operator may readily bodily lift the frame 26 and attendant parts, the pawls 38 running idly over the thread of the screw 35. It will furthermore be noted that in the lowering of the frame 26, the gear 69 slides along the pinion 63 while maintaining engagement therewith.

The normal position of the rocking member 76 is that shown in Fig. 4, wherein the drive of the gear 67 is through the gears 70, 71 and 31ª, these gears being so proportioned that the necessary time is given for performing the operations hereinbefore explained at the conclusion of the playing of the record. It may become desirable, however, as, for example, in case the operator wishes to interrupt playing a record delivered to the turn-table, to speed up the gear 67, and I have provided for this by the pivoting of the member 76, as stated, and the provision of the gears 72, 73, 74 and 75. The rocking member 76 is connected with one end of a spring 102, the opposite end of which connects with a plate 105, forming a part of the frame 26, which tends to shift the member 76 to a position in which the gear 72 meshes with the gear 67 and the gear 70 is out of mesh with the latter, this member being equipped with any suitable operating mechanism for controlling its position. The means shown in the drawings for this purpose comprise a pivotally supported member 103, the pivot of which, indicated at 104, is secured in the top plate 105 of the frame 26, the member 103 being provided with a depending stud 106 extending through an arc-shaped opening 107 in the plate 105 and connected at its lower end with a rod 108 sliding in a guide 109, the outer end of the rod 108 extending to a point on the machine where it is accessible for sliding it in the guide 109, the portion of this rod at which it is operated by the operator being represented at 110. The member 103 at the end thereof opposite that equipped with the stud 106 coöperates, under the action of the spring 102, with a lug 111 on the member 76, this part of the member 103 being formed with a cam surface 112 which in moving against the lug 111 forces the member 76 to a position in which the gear 70 meshes with the gear 67. This part of the member 103 also contains a notch 113, which when opposing the lug 111, permits the spring 102 to swing the member 76 to a position in which both the gear 72 and the gear 70 are out of mesh with the gear 67, and beyond this notch the surface 103ª of the member 103 is so formed that when it opposes the lug 111 the gear 72 will mesh with the gear 67 and the gear 70 will be out of mesh with the gear 67. To aid in the setting of the member 103 through the medium of the hand-piece 110 in the different positions just referred to, the rod 108 contains three notches, 114, 115, and 116, with which a spring-detent 117 secured to the tube 109 coöperates. When the rod 108 is in the position shown in the drawing, with the detent 117 extending into the notch 114, the gears 70 and 67 mesh; when this rod is shifted inwardly to engage the detent 117 with the notched portion 115 of the rod 108, neither the gear 70 nor 72 is in mesh with the gear 67; and when the rod 108 is shifted to engage the detent 117 with the notched portion 116 of this rod the drive is from the gear 31ª through the gears 75, 74, 73 and 72 to gear 67.

The button 110 may, together with the button 27ª and another button 118, be located at any desirable and convenient place on the machine, as, for example, as shown in Fig. 1, the button 118 coöperating with elements as explained of the button 110, for controlling the lengthwise movement of the clutch-block 64ª, slidable on the spindle 47 to control the operation of the record-feeding mechanism and the mechanism by which the frame 26 and the parts supported thereby, are lowered intermittently.

It will be understood that when the button 118 is moved to unclutch the pinion 64 from the spindle 47 no movement of the feed-disks 56 occurs when the pinion 63 is operating, but the tone-arm and reproducer are actuated as hereinbefore described, with the result of repositioning the reproducer at the beginning of the record played by the previous operation. Thus under the control of the operator any one of the records may be automatically replayed as many times as desired.

The tappets 96 should be adjusted to such positions on the cross-bar 95 as not only to swing the tone-arm clear of the record prior to the record-changing operation, but to cause the stylus of the reproducer to extend above the beginning of the groove of the record to be played, in the return of the reproducer to playing position, the adjustment feature of these tappets permitting of the proper automatic positioning of the reproducer for records of different diameters. The slotted construction of the member 76 is also provided as a desirable means to adapt the machine to the use of records of different diameters. Where records of different diameters, involving a greater length of spiral-indented groove for coöperation with the stylus, are used, the gear 71 would be larger and substituted for that shown, the slot 76ᵃ permitting of the adjustment of such larger gear relative to the pinion 31ᵃ to insure the proper mesh.

In the machine shown provision is made for automatically stopping the machine after a predetermined number of records have been played, this being accomplished by a switch shown in Fig. 2 and interposed in a manner (not shown) in the circuit for driving the motor 27. The switch shown is formed of a pair of contacts 119 and 120 on a block 121 of insulating material, the contact 119 being a spring-contact normally closing the motor-circuit through the contact 120. The block 121 is mounted on the lower end of a tube 122 supported at 123 to be vertically adjustable on the stationary frame 43 and vertically movable in this tube is a rod 124 which extends at its lower end against the spring contact 119 and at its upper end is in the path of downward movement of the top-plate 105 of the frame 26. When the frame 26 lowers to a point where it bears down on the rod 124 it breaks the motor-circuit and the machine stops. By adjusting the tube 122 vertically on the frame 43, the machine may be set to play any desired number of the records charged into the machine, a scale (not shown) on the tube 122 permitting the operator to readily position the tube to provide for the playing of the desired number of records.

When it is desired that the machine be used as in the case of the usual machine, in other words, played by the manual application of the records to the turn-table and the manual manipulation of the tone-arm and reproducer 21, the operator lifts the spindle sections 48 from the sections 47 and by operating the button 110 to move the rod 108 to a position where the detent 117 engages the notched portion 116 of this rod, disconnects the driving pinion 31ᵃ from the gear 67, by reason of the rocking of the member 76 to neutral position.

It will be understood from the foregoing that the drive of the pinion 72 from the pinion 73 is a friction-drive and this is effected in the particular construction illustrated by rotatably mounting the pinion 72 on a sleeve-extension 125 of the pinion 73 which is rotatable on its supporting stud 126, and frictionally holding these pinions together by a collar 127 secured on the sleeve-extension 125 with friction-disks 128 between this collar, the gear 72 and gear 73.

The purpose of the friction-connection between the gears 72 and 73 is to permit the gear 72 to slip relative to the gear 73 in case the operator in speeding up the rotation of the gear 67 by shifting the member 76 to drive the gear 67 through the gear 72, fails to shift the member 76 to discontinue such speeding up, before the segmental gear 69 engages the pinion 63, and thus positive means are presented which prevent the record-feeding and tone-arm-operating means from being operated at undue speed.

While I have illustrated and described a particular construction in which my invention is embodied, I do not wish to be understood as intending to limit it thereto, as the same may be variously modified and altered without departing from the spirit of my invention.

What I regard as new and desire to secure by Letters Patent is:

1. In a talking machine, the combination of record-driving mechanism, sound-reproducing mechanism coöperating therewith, a series of rotatable record-supporting and feeding disks each presenting a peripheral opening with portions of the disk at said opening being spaced apart vertically a distance substantially equal to the thickness of a record, the upper portions of the disks at said openings moving, in the rotation of said disks, in a plane substantially parallel with the plane of the records and entering between the lowermost record supported on said disks and the records above it, to separate them in the rotation of the disks, while the records are supported on the lower portions of said disks, the lowermost record thus separated discharging through the said openings to the record-driving mechanism, and means for causing the supported records to move, in the rotation of the disks, from a position in which they are supported on said upper portions of said disks to a position in which they are supported on said lower portions thereof.

2. In a talking machine, the combination of record-driving mechanism, sound-reproducing mechanism coöperating therewith, a series of rotatable record-supporting and feeding disks each presenting a peripheral opening with portions of the disk at said opening being spaced apart vertically a distance substantially equal to the thickness of a record, the upper portions of the disks at said openings being flexible and moving, in the rotation of said disks, in a plane substantially parallel with the plane of the records and entering between the lowermost record supported on said disks and the records above it, to separate them in the rotation of the disks, while the records are supported on the lower portions of said disks, the lowermost record thus separated discharging through the said openings to the record-driving mechanism, and means for causing the supported records to move, in the rotation of the disks, from a position in which they are supported on said upper portions of said disks to a position in which they are supported on said lower portions thereof.

3. In a talking machine, the combination of record-driving mechanism, sound-reproducing mechanism coöperating therewith, means operating automatically to move said sound-reproducing mechanism into and out of playing position, a series of rotatable devices containing grooved peripheries and presenting mutilated flanges spaced apart vertically above and below said grooves and constructed and arranged to support at said flanges a pile of records above said record-driving mechanism and by successive steps discharge said records in succession from said upper flanges at said mutilated portions thereof to said lower flanges and from said lower flanges at said mutilated portions thereof to said record-driving means, and in the operation of said devices moving at their upper flanges between the lowermost record on the lower flanges and those above it, and means for operating said rotatable devices to discharge the records therefrom while said sound-reproducing mechanism is out of the path of movement of the records.

4. In a talking machine, the combination of record-driving mechanism, sound-reproducing mechanism coöperating therewith, means operating automatically to move said sound-reproducing mechanism into and out of playing position, a series of rotatable devices containing grooved peripheries and presenting mutilated flanges spaced apart vertically above and below said grooves and at different points on their circumferences, and constructed and arranged to support at said flanges a pile of records above said record-driving mechanism and by successive steps discharge said records in succession from said upper flanges at said mutilated portions thereof to said lower flanges and from said lower flanges at said mutilated portions thereof to said record - driving means, and in the operation of said devices moving at their upper flanges between the lowermost record on the lower flanges and those above it, and means for operating said rotatable devices to discharge the records therefrom while said sound - reproducing mechanism is out of the path of movement of the records.

5. In a talking machine, the combination of record-driving mechanism, sound reproducing mechanism coöperating therewith, means operating automatically to move said sound-reproducing mechanism into and out of playing position, a series of rotatable devices constructed and arranged to support a pile of records above said record-driving mechanism and, when operated, discharge the lowermost one of said records to said record-driving mechanism and retain the others in elevated position, means operatively connecting said rotatable devices together for simultaneous operation to feed a record to said record-driving mechanism, and means for actuating said rotatable devices to discharge the records therefrom while said sound-reproducing mechanism is out of the path of movement of the records.

6. In a talking machine, the combination of record-driving mechanism, sound reproducing mechanism coöperating therewith, means operating automatically to move said sound reproducing mechanism into and out of playing position, a series of rotatable devices constructed and arranged to support a pile of records above said record-driving mechanism and, when operated, discharge the lowermost one of said records to said record-driving mechanism and retain the others in elevated position, gears connected with said rotatable devices, a gear meshing with said first-named gears to effect simultaneous rotation of all of said rotatable devices, and means for actuating said gears.

7. In a talking machine, the combination of record-driving mechanism, sound-reproducing mechanism coöperating therewith, means operating automatically to move said sound-reproducing mechanism into and out of playing position, a series of devices grouped about said record-driving mechanism at relatively fixed points, and constructed with the axes about which they rotate extending upwardly, said devices being arranged to support the pile of records above said record-driving mechanism and, when operated, discharge the lowermost one of the records to said record-driving mechanism and retain the others in elevated position, and power means for actuating said devices to discharge the records therefrom while said sound-reproducing mechanism is out of the path of movement of the records.

8. In a talking machine, the combination of record-driving mechanism, sound-reproducing mechanism coöperating therewith, means operating automatically to move said sound-reproducing mechanism into and out of playing position, a series of devices grouped about said record-driving mechanism at relatively fixed points, and constructed and arranged to support a pile of records above said record-driving mechanism, and, when operated, discharge the lowermost one of the records to said record-driving mechanism and retain the others in elevated position, means operatively connecting said devices together to cause them to operate simultaneously, and means for actuating said devices to discharge the records therefrom while said sound-reproducing mechanism is out of the path of movement of the records.

9. In a talking machine, the combination of a source of power, record-driving mechanism operated therefrom, sound-reproducing mechanism coöperating with said record-driving mechanism, means actuated from said source of power, operating automatically, to move said sound-reproducing mechanism into and out of playing position, a series of devices separately rotatably supported on the machine and grouped about said record-driving mechanism and constructed and arranged to support a pile of records above said record-driving mechanism and, when operated, discharge the lowermost one of said records to said record-driving mechanism and retain the others in elevated position, and means actuated from said source of power, for actuating said devices to discharge the records therefrom while said sound-reproducing mechanism is out of the path of movement of the records.

10. In a talking machine, the combination of record-driving means, means for feeding records, in succession, to said record-driving means, sound-reproducing mechanism coöperating with said record-driving means, means, operating automatically, to lift said sound-reproducing mechanism from the record and move it to a position in which it is out of the path of movement of the record being fed to the record-driving means, and after said second-named means have operated to feed a record to the record-driving means, to move said sound-reproducing mechanism into engagement with the record last fed to the record-driving means, and means operating automatically to discontinue the operation of the machine after the playing of a plurality of the records.

11. In a talking machine, the combination of record-driving means, means for feeding records, in succession, to said record-driving means, sound-reproducing mechanism coöperating with said record-driving means, means, operating automatically, to lift said sound-reproducing mechanism from the record and move it to a position in which it is out of the path of movement of the record being fed to the record-driving means, and after said second-named means have operated to feed a record to the record-driving means, to move said sound-reproducing mechanism into engagement with the record last fed to the record-driving means, and means operating automatically to discontinue the operation of the machine after the playing of a plurality of the records and adjustable to effect such discontinuance upon the playing of any number of the records as desired.

12. In a talking machine, the combination of a vertically movable support, record-driving means supported thereon, means for feeding records, in succession, to said record-driving means, sound-reproducing mechanism coöperating with said record-driving means, means, operating automatically, to lift said sound-reproducing mechanism from the record and move it to a position in which it is out of the path of movement of a record being fed to the record-driving means and after said second-named means have been operated to feed a record to the record-driving means, to move said sound-reproducing mechanism into engagement with the record last fed to the record-driving means, means for lowering said support a distance substantially equal to the thickness of a record each time said record-feeding means operate, and means operated by the movement of said support for automatically discontinung the operation of the machine after a plurality of the records have been played.

13. In a talking machine, the combination of record-driving mechanism, a series of devices arranged above said record-driving mechanism for supporting records and feeding them to said mechanism each formed with a record-supporting portion and a flexible portion above said record-supporting portion adapted in the movement of said devices to move substantially in the plane of the records and enter between the lowermost record and the one immediately above it, and means for actuating said devices, said record-supporting portions being constructed to release the lowermost record after separation thereof from those above it.

14. In a talking machine, the combination of record-driving mechanism, a series of rotatable devices arranged above said record-driving mechanism for supporting records and feeding them to said mechanism each formed with a record-supporting portion and a flexible portion above said record-supporting portion adapted in the movement of said devices to move substantially in the plane of the records and enter between the lowermost record and the one immediately above it, said record-supporting portions being constructed to release the lowermost record after separation thereof from those above it, and means for rotating said devices.

15. In a talking machine, the combination of record-driving mechanism, a series of devices arranged above said record-driving mechanism for supporting records and feeding them to said mechanism each formed with a record-supporting portion and a flexible portion above said record-supporting portion adapted in the movement of said devices to move substantially in the plane of the records and enter between the lowermost record and the one immediately above it, said record-supporting portions being so formed as to permit the lowermost record to drop therefrom in one position of said devices and said flexible portion to extend beneath the next lowermost record, and means for actuating said devices.

16. In a talking machine, the combination of record-driving mechanism, a series of rotatable devices arranged above said record-driving mechanism for supporting records and feeding them to said mechanism, each formed with a record-supporting portion and a flexible portion above said record-supporting portions adapted in the movement of said devices to move substantially in the plane of the records and enter between the lowermost record and the one immediately above it, said record-supporting portions being so formed as to permit the lowermost record to drop therefrom in one position of said devices and said flexible portions to extend beneath the next lowermost record, and means for actuating said devices.

17. In a talking machine, the combination of record-driving mechanism, sound reproducing mechanism coöperating therewith, means operating automatically to move said sound reproducing mechanism into and out of playing position, a series of rotatable devices containing grooved peripheries and presenting mutilated flanges above and below said grooves, the upper one of said flanges having a flexible section which extends substantially in the plane of the records, said rotatable devices being constructed and arranged to support at said flanges a pile of records above said record-driving mechanism and by successive steps discharge said records in succession from said upper flanges at said mutilated portions thereof to said lower flanges and from said lower flanges at said mutilated portions thereof to said record-driving means, and means for rotating said devices to discharge the records therefrom while said sound reproducing mechanism is out of the path of movement of the records.

18. In a talking machine, the combination of a relatively movable support, record-driving mechanism, including a power-producing device on said support, sound-reproducing mechanism coöperating with said record-driving mechanism and mounted on a part of the machine stationary relative to said support, means operating automatically to move said sound-reproducing mechanism into and out of playing position, record-supporting and feeding means extending above said support and driven from said record-driving mechanism, and means whereby said support automatically shifts in the operation of the machine for causing the records being played to extend in substantially the same plane.

19. In a talking machine, the combination of a relatively movable support, record-driving mechanism, including a power-producing device on said support, sound reproducing mechanism coöperating with said record-driving mechanism and mounted on a part of the machine stationary relative to said support, means operating automatically to move said sound reproducing mechanism into and out of playing position, record-supporting and feeding means extending above said support and intermittently driven from said record-driving mechanism, and means operated from said record-driving mechanism whereby said support shifts a distance substantially equal to the thickness of a record with each record-feeding operation to cause the records being played to extend in substantially the same plane.

20. In a talking machine, the combination of a relatively movable support, record-driving mechanism on said support, sound-reproducing mechanism coöperating with said record-driving mechanism and mounted on a part of the machine stationary relative to said support, means operating automatically to move said sound-reproducing mechanism into and out of playing position, record-supporting and feeding means extending above said support and intermittently driven from said record-driving mechanism and including a gear meshing in the movement of said support in its various positions vertically, with a portion of said record-driving mechanism, and means whereby said support automatically shifts in the operation of the machine for causing the records being played to extend in substantially the same plane.

21. In a talking machine, the combination of record-driving mechanism, sound-reproducing mechanism coöperating therewith, means, operating automatically, to move the sound-reproducing mechanism into and out of playing position, record-supporting and feeding means formed of rotatable devices engaging the records to be supported and fed, said devices being operatively connected together for simultaneous operation by means including a gear, means for actuating said record-supporting and feeding means, and means operated by said gear for causing the portion of said record-driving mechanism at which the record is supported when being played, to lower a distance substantially equal to the thickness of a record with each record-feeding operation to cause the records being played to extend in substantially the same plane.

22. In a talking machine, the combination of a vertically movable support, record-driving mechanism on said support, sound-reproducing mechanism coöperating with said record-driving mechanism and mounted on a part of the machine stationary relative to said support, means operating automatically to move said sound reproducing mechanism into and out of playing position, record-supporting and feeding means extending above said support and involving rotatable feeding devices operatively connected together and including a gear connected with one of said devices and by the operative connection of said devices with each other driving all of said feeding devices, and means whereby said support shifts a distance substantially equal to the thickness of a record with each record-feeding operation to cause the records being played to extend in substantially the same plane.

23. In a talking machine, the combination of record-driving mechanism, sound reproducing mechanism coöperating therewith, means operating to move said sound-reproducing mechanism into and out of playing position, a series of rotatable devices grouped about said record-driving mechanism, means removably engaging said rotatable devices and rotating with the latter for supporting a pile of records above said record-driving mechanism and operating, when actuated, to automatically deliver the records in succession to said record-driving mechanism, while said sound-reproducing mechanism is out of the path of movement of the records, and means for actuating said rotatable devices.

24. In a talking machine, the combination of a record-driving mechanism, sound-reproducing mechanism coöperating therewith, means operating to move said sound-reproducing mechanism into and out of playing position, a series of rotatable devices grouped about said record-driving mechanism, and means removably engaging said rotatable devices and rotating with the latter for supporting a pile of records above said record-driving mechanism and operating, when actuated, to automatically deliver the records in succession to said record-driving mechanism while said sound-reproducing mechanism is out of the path of movement of the records, and means located below the portion of said record-driving mechanism which supports the records, for driving said rotatable devices.

25. In a talking machine, the combination of record-driving mechanism, sound-reproducing mechanism coöperating therewith, means operating automatically to move said sound-reproducing mechanism into and out of playing position, a series of rotatable devices grouped in fixed positions about said record-driving mechanism and separately rotatably supported, means removably engaging said rotatable devices and rotating with the latter for supporting a pile of records above said record-driving mechanism and operating, when actuated, to automatically deliver the records, in succession, to said record-driving mechanism while said sound-reproducing mechanism is out of the path of movement of the records, and means for actuating said rotatable devices.

26. In a talking machine, the combination of record-driving mechanism, sound-reproducing mechanism coöperating therewith, means operating automatically to move said sound-reproducing mechanism into and out of playing position, a series of rotatable devices grouped in fixed positions about said record-driving mechanism and separately rotatably supported, means removably engaging said rotatable devices below the plane in which the portion of said record-driving mechanism on which the records rest, rotates, and rotating with said rotatable devices for supporting a pile of records above said record-driving mechanism, and operating, when actuated, to automatically deliver the records in succession to said record-driving means while said sound-reproducing mechanism is out of the path of movement of the records, means operatively connecting said devices together for simultaneous operation, and means for actuating said devices.

27. In a talking machine, the combination of record-driving mechanism, sound-reproducing mechanism coöperating therewith, means operating automatically to move said sound-reproducing mechanism into and out of playing position, a series of rotatable spindles grouped about the axis of said record-driving mechanism, means for driving said spindles, and record-supporting and feeding elements releasably connected with, and carried by, said spindles to extend above the part of said record-driving mechanism which supports the record being played.

28. In a talking machine, the combination of record-driving mechanism, sound-reproducing mechanism coöperating therewith, means operating automatically to move said sound-reproducing mechanism into and out of playing position, a series of rotatable devices constructed and arranged to support a pile of records above said record-driving mechanism and when operated discharge the lowermost one of said records to said record-driving mechanism and retain the others in elevated position, means operating automatically for operating said rotatable devices to discharge the records therefrom while said sound-reproducing mechanism is out of the path of movement of the records, and manually controlled means, controlling the actuation of said second-named means to discontinue the feed of records at will to the record-driving mechanism without interfering with the operation of said first-named means.

29. In a talking machine, the combination of a source of power, record-driving mechanism operated from said source, sound-reproducing mechanism coöperating with said record-driving mechanism, means operating automatically from said source to move said sound-reproducing mechanism into and out of playing position, a series of rotatable devices constructed and arranged to support a pile of records above said record-driving mechanism and, when operated, discharge the lowermost one of said records to said record-driving mechanism and retain the others in elevated position, means operating automatically from said source of power for operating said rotatable devices to discharge the records therefrom while said sound-reproducing mechanism is out of the path of movement of the records, and manually-controlled means controlling the actuation of said second-named means to discontinue the feed of records at will to said record-driving mechanism without interfering with the operation of said first-named means.

30. In a talking machine, the combination of record-driving mechanism, sound-reproducing mechanism coöperating therewith, means operating automatically to move said sound-reproducing mechanism into and out of playing position, a series of rotatable devices constructed and arranged to support a pile of records above said record-driving mechanism and, when operated, discharge the lowermost one of said records to said record-driving mechanism and retain the others in elevated position, means operatively connecting said rotatable devices together for simultaneous operation, means for driving said rotatable devices to discharge the records therefrom while said sound-reproducing mechanism is out of the path of movement of the records including a gear journaled relative to one of said rotatable devices, and manually-controlled means for releasably connecting said gear with said last-referred to rotatable device, whereby the feed of records may be discontinued at will, under the control of the operator.

31. In a talking machine, the combination of record-driving mechanism, sound-reproducing mechanism coöperating therewith, a series of rotatable devices constructed and arranged to support a pile of records above said record-driving mechanism and, when operated, discharge the lowermost one of said records to said record-driving mechanism and retain the others in elevated position, means operatively connecting said rotatable devices together for simultaneous operation, means for rotating said rotatable devices including a gear journaled relative to one of said rotatable devices, means for releasably connecting said gear with said last-referred to rotatable device at will, under the control of the operator, and means operated from said gear independently of the position of the said releasable means engaging said gear with said rotatable devices, to automatically move said sound-reproducing mechanism into and out of playing position, said record-feeding means being so constructed and arranged that the record-feeding operation occurs when said sound-reproducer is out of the path of movement of the records.

32. In a talking machine, the combination of record-driving mechanism, sound-reproducing mechanism coöperating therewith, means, operating automatically, to move said sound-reproducing mechanism into and out of playing position, means for feeding records in succession to said record-driving mechanism, means intermittently engaging said last-named means to effect intermitten feed of the records to said record-driving means, and means, operating automatically, to lock said second-named means against movement when not engaged by said third-named means, to prevent accidental feeding of a record to the record-driving mechanism during the playing of a record and to unlock said second-named means for movement to permit another record to be fed to the record-driving mechanism.

33. In a talking machine, the combination of record-driving mechanism, sound-reproducing mechanism coöperating therewith, means for moving said sound-reproducing mechanism into and out of playing position, a series of movable elements operating, when actuated, to feed in succession records supported thereon, to said record-driving mechanism, means intermittently engaging said elements to produce an intermittent feed of the records, and means, operating automatically, to lock said elements against movement when not engaged by said second-named means, to prevent accidental feeding of a record to the record-driving mechanism during the playing of a record and to unlock said elements for movement to permit another record to be fed to the record-driving mechanism.

34. In a talking machine, the combination of record-driving mechanism, sound-reproducing mechanism coöperating therewith, means for moving said sound-reproducing mechanism into and out of playing position, a series of rotatable elements operating, when rotated, to feed in succession records supported thereon, to said record-driving mechanism, means intermittently engaging said elements to produce an intermittent feed of the records, and means, operating automatically, to lock said elements against movement when not engaged by said second-named means, to prevent accidental feeding of a record to the record-driving mechanism during the playing of a record, and to unlock said elements for movement to permit another record to be fed to the record-driving mechanism.

35. In a talking machine, the combination of record-driving mechanism, sound-reproducing mechanism coöperating therewith, means for moving said sound-reproducing mechanism into and out of playing position, a series of rotatable elements operating, when rotated, to feed in succession records supported thereon, to said record-driving mechanism, means intermittently engaging said elements to produce an intermittent feed of the records and including a gear rotatable with said elements, a shiftable member operating when in one position to lock said gear against rotation and to be shifted out of locking position, and means operating automatically to cause said locking member to engage said gear for locking said elements against rotation when not engaged by said second-named means, to prevent accidental feeding of a record to the record-driving mechanism during the playing of a record, and cause said locking member to disengage from said gear to unlock said elements for movement to permit another record to be fed to the record-driving mechanism.

36. In a talking machine, the combination of record-driving means, sound-reproducing mechanism coöperating with said record-driving means, mechanism, operating automatically, to move said sound-reproducing mechanism into and out of playing position, means for automatically feeding records to said record-driving means, and means, controlled by the operator at will, for causing said second-named mechanism and said second-named means to operate sooner than they do in the normal operation of the machine to lift the sound-reproducing mechanism from the record before it reaches the end of the record groove and thereby effect discontinuation of the play of a record before the playing of the same has been completed and feeding the next record into playing position.

37. In a talking-machine, the combination of record-driving means, sound-reproducing mechanism coöperating therewith, mechanism operating automatically during a portion of its movement to move said sound-reproducing mechanism into and out of playing position, means for feeding records to said record-driving means, and means for speeding up the operation of said second-named mechanism during the portion of the movement thereof when said sound-reproducing mechanism is not being moved by said mechanism to cause said second-named mechanism to operate said sound-reproducing mechanism sooner than it does in the normal operation of the machine.

38. In a talking machine, the combination of record-driving means, sound-reproducing mechanism coöperating therewith, mechanism, operating automatically, during a portion of its movement to move said sound-reproducing mechanism into and out of playing position and feed records to said record-driving means, and means for speeding up the operation of said second-named mechanism during the portion of the movement thereof when said sound-reproducing mechanism is not being moved thereby and records are not being fed, to cause said second-named mechanism to operate sooner than in the normal operation of the machine, to lift the sound-reproducing mechanism from the record before it reaches the end of the record groove and thereby effect discontinuation of the play of a record before playing of the same has been completed and feeding the next record into playing position.

39. In a talking machine, the combination of record-driving means, sound-reproducing mechanism coöperating with said record-driving means, mechanism, operating automatically, to move said sound-reproducing mechanism into and out of playing position, means for automatically feeding records to said record-driving means, and means, controlled by the operator at will, for causing said second-named mechanism and said second-named means to operate sooner than they do in the normal operation of the machine without increasing the speed of rotation of the record-driving means, to lift the sound-reproducing mechanism from the record before it reaches the end of the record groove and thereby effect discontinuance of the play of a record before the same has been completed and the feeding of the next record into playing position.

40. In a talking machine, the combination of a rotatable record-support, means for driving it, sound-reproducing mechanism coöperating with said support, a gear driven by said first-named means, means actuated by said gear to move said sound-reproducing mechanism into and out of playing position, record-feeding means driven from said gear, and means, under the control of the operator, for speeding up the rotation of said gear relative to said first-named means, to cause said second-named means and said record-feeding means to operate sooner than in the normal operation of the machine to lift the sound-reproducing mechanism from the record before it reaches the end of the record groove and thereby discontinue the playing of a record before playing the same has been completed and feeding the next record into playing position.

41. In a talking machine, the combination of record-driving means, sound-reproducing mechanism coöperating with said record-driving means, means for moving said sound-reproducing mechanism into and out of playing position, means for feeding records in succession to said record-driving means, and means operating, under the control of the operator, to discontinue at any time the playing of a record and feed another record into playing position by operation of said third-named means sooner than it is fed in the normal operation of the machine, and re-positioning said sound-reproducing mechanism for playing the record last fed.

42. In a talking-machine, the combination of a rotatable record-support, means for driving it, sound-reproducing mechanism coöperating therewith, a gear driven by said first-named means, means actuated by said gear operating automatically during a portion of the movement of said gear to move said sound-reproducing mechanism into and out of playing position, record-feeding means driven from said gear during a portion of the movement of the latter, and means for speeding up the operation of said gear during the portion of its movement when not actuating said second-named means and said record-feeding means to cause said second-named means to move said sound-reproducing means, and actuate said record-feeding means to feed a record, sooner than in the normal operation of the machine.

43. In a talking machine, the combination of record-driving mechanism, sound-reproducing mechanism coöperating therewith, means, operating automatically, to move the sound-reproducing mechanism into and out of playing position, record-feeding means for feeding records in succession to said record-driving mechanism, means for causing the portion of the record-driving mechanism at which the record is supported when being played to automatically lower to cause the records being played to extend in substantially the same plane, and a single operating means operating when actuated to effect discontinuation of the feed of records to said record-driving mechanism and the lowering of the portion of the record-driving mechanism upon which the records are supported, without affecting the operation of said first-named means.

GARRETT W. WOODWARD.